United States Patent [19]

Sargent

[11] Patent Number: 4,569,048
[45] Date of Patent: Feb. 4, 1986

[54] METHOD AND APPARATUS FOR MEMORY OVERLAY

[75] Inventor: Brian Sargent, Dunstable, Mass.

[73] Assignee: GenRad, Inc., Concord, Mass.

[21] Appl. No.: 533,444

[22] Filed: Sep. 19, 1983

[51] Int. Cl.[4] .......................... G06F 9/16; G06F 11/00
[52] U.S. Cl. ...................................... 371/16; 364/200
[58] Field of Search ............................. 371/16, 15, 18;
364/200, 900

[56] References Cited

U.S. PATENT DOCUMENTS

| | | | |
|---|---|---|---|
| 3,911,402 | 10/1975 | McLean et al. | 364/200 |
| 3,978,455 | 8/1976 | Valassis et al. | 364/200 |
| 4,122,519 | 10/1978 | Bizlawski et al. | 364/200 |
| 4,422,144 | 12/1983 | Johnston et al. | 364/200 |
| 4,439,828 | 3/1984 | Martin | 364/200 |

Primary Examiner—Michael R. Fleming
Attorney, Agent, or Firm—Cesari & McKenna

[57] ABSTRACT

A microprocessor-based system (10) is tested by a testing device (32) that substitutes instructions from a substitute memory (38) for those in the main memory (28) of the system (10) under test. When the processor (12) of the system under test attempts to read a location in its memory (28), it places signals on bus address lines (22) to designate the memory location and places a data-direction signal on a control line (50) to indicate that the memory (28) is to transmit rather than receive information. In ordinary operation, the memory then places its data on bus data lines (24). In order to replace the data from the main memory (28) with data from the substitute memory (38), the testing device (32) senses whether the address lines (22) carry the address of a memory location whose contents are to be substituted. When such an address is detected, it overdrives the control line (50) to cause it to indicate a write rather than a read. This prevents the main memory (28) from placing its data on the data lines (24). Instead, the test device (32) causes its substitute memory (38) to place its contents on the data lines (24). Since there is no contention between the substitute memory (38) and the main memory (28), the contents of the substitute memory (38) can be placed on the data lines (24) without overdriving them.

6 Claims, 3 Drawing Figures

METHOD AND APPARATUS FOR MEMORY OVERLAY

BACKGROUND OF THE INVENTION

The present invention relates to the testing of processor-based systems. It particularly concerns a device for testing such systems by employing a memory-overlay technique.

Microprocessors and similar stored-program devices are widely employed for controlling systems of various types. In order to perform in-circuit tests of processor-controlled systems, it is ordinarily desirable for the testing device to sense the operations of various components of the system under test not only under ordinary processor control but also under the control of the test system.

One way to substitute a testing routine for the routine ordinarily executed by the processor is to provide a switching mechanism for connecting the processor to and disconnecting it from the processor-controlled components. Although arrangements of this type may be satisfactory in some circumstances, it is quite inconvenient in other circumstances to disconnect the microprocessor from the microprocessor-controlled components. Additionally, disconnecting the microprocessor alters the environment of the device under test, and certain defects that are only apparent when the processor is connected to the processor-controlled devices will not be detected. Furthermore, there are limits to the speed at which the processor can be switched into and out of the circuit. Too low a speed may cause the testing procedure to be intolerably long and, in fact, may make it impossible to test the system at the speed at which it is intended to operate.

Because of these drawbacks, another type of test system is often employed. In systems of this type, the processor remains in the circuit, but the test system includes connections that allow it to substitute its own instructions for the instruction that the microprocessor attempts to read from its program memory. This general approach is referred to as *memory overlay*.

An advantage of the memory-overlay technique is that it is ordinarily possible to substitute the test-system memory for the device-under-test memory at a speed faster than that at which complete connection and disconnection of the processor can be accomplished. A typical way to use the memory-overlay technique involves detecting commands from the processor directing the memory to place an instruciton on data lines of a bus connecting the memory to the processor. When such commands are detected, the test system drives the data lines with enough current to overcome those instruction signals and to substitute signals from the test-system memory. Such a technique results in considerable instantaneous power dissipation because the desired substitute-signal voltages have to be developed across the low output impedances of the memory bus drivers. Since any individual overdriving signal is present only for a very short time, no single overdriving signal will cause enough dissipation to damage the circuitry. But when such signals are applied repetitively, significant average power dissipation can result. To avoid the resulting thermal stresses, it is a design constraint on the test system that it avoid too-frequent repetition of overdriving signals. This can be an undesirable restriction.

Furthermore, although this technique results in significant speed advantages over complete disconnection of the processor from the processor-controlled devices, the use of large currents still restricts speed to some extent. The test system typically will need not only to substitute its instructions for some of the usual instructions on the data lines but also to sense the data-line contents when it allows the processor, the memory, or some other processor-controlled component of the system under test to place data on the data lines. Switching from the overdriving mode to the high impedance required for the sensing mode introduces delays that increase in duration with increases in the current required for overdriving.

An object of the present invention is to improve the memory-overlay technique by reducing power dissipation and permitting greater testing speed.

SUMMARY OF THE INVENTION

The foregoing and related objects are achieved in a memory-overlay test system that avoids the need to overdrive the data lines on which the processor instructions are transmitted. It does this by overdriving only lines containing control signals that command the memory or other processor-controlled device to transmit instructions or other data to the processor. Specifically, the test system of the present invention senses when the processor of the system under test attempts to read an instruction from a memory location for which the test system is to provide a substitute. In such an attempt, the processor sends the address of the memory location over the address lines of the processor bus and sends control signals that indicate that the memory module is to place the contents of that memory location on the bus data lines.

However, the test system of the present invention overdrives one or more of the lines over which the processor attempts to send the transmit command so that the system-under-test memory receives no command to place instructions on the data bus. The memory thus presents high impedances to the data lines and thus does not require overdriving currents. Accordingly, the test system only has to drive the data lines at the current level ordinarily necessary to place signals on them.

As a consequence, since only one or a few control lines need to be overdriven by the test system, the power dissipation is a fraction of that required to overdrive all the data lines, and instruction substitution can therefore be performed more frequently. Furthermore, according to the preferred embodiment of the present invention, there is no need to switch the test system between an overdriving mode and a sensing mode; sensing and overdriving are performed simultaneously. The speed penalty otherwise encountered in overdriving is thereby avoided.

BRIEF DESCRIPTION OF THE DRAWINGS

These and other features and advantages of the present invention are described in connection with the accompanying drawings, in which.

DETAILED DESCRIPTION OF THE PREFERRED EMBODIMENT

Figure 1:
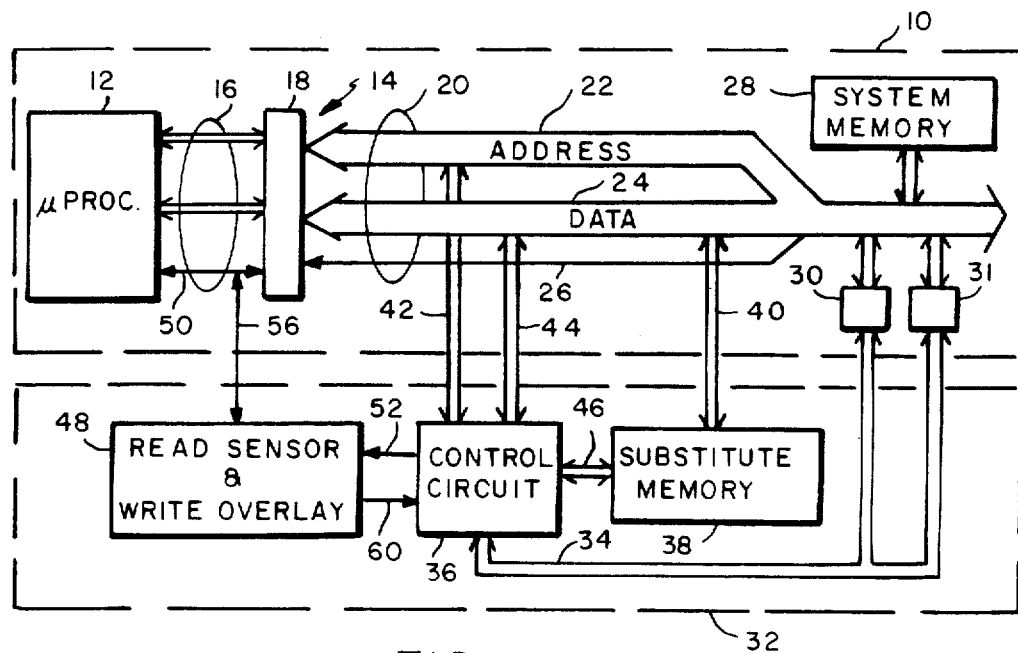
FIG. 1 is a generalized block diagram of a microprocessor-based system and the memory-overlay test system of the present invention.

FIG. 1 diagrammatically depicts a typical microprocessor-based system 10. A control circuit in the form of a microprocessor 12 communicates by means of signals placed on a bus 14. For present purposes, the *bus* will be considered to include the lines 16 from the microprocessor to a buffer circuit 18 as well as lines 20 leading from the buffer circuit 18 to devices with which the microprocessor communicates. This type of bus arrangement is not universal, but it is a convenient model by which the principles of the present invention can be explained. In particular, although a *bus* normally provides communication with more than one device, the principles of the present invention are equally applicable when only one processor-controlled device is on the "bus."

The illustrated bus 14 has address lines 22, data lines 24, and a single direction control line 26. Those skilled in the art will recognize that this also is not a universal arrangement. In fact, processor-based systems typically have more than one control line. To simplify the explanation, only one line carrying data-direction signals is shown in the present example, but this line serves as an example of the lines that customarily carry command signals that direct that data be written or read.

Additionally, not all systems send different types of signals on separate lines; the same lines in some systems carry address signals at one time, data signals at another time, and control signals at still another time. It will become apparent that the teachings of the present invention can be applied to such systems also.

The system 10 under test is depicted with the memory 28 represented by a single block. A typical system may have a read-only memory containing its program instructions and a read-write memory for storing other types of data. Other types of systems may store both instructions and data in the same memory. For the purposes of the present discussion, memory 28 is whatever memory contains the program instructions of the microprocessor-based system 10.

Blocks 30 and 31 in FIG. 1 represent other processor-controlled devices. Their identities depend greatly on the type of system 10 that is being tested. For instance, devices 30 and 31 may be solenoid drivers, sensors, stepper-motor drivers, or other components that the microprocessor 12 is to control. These devices are on the same bus 14 as the program memory 28, but this arrangement is not necessary for application of the teachings of the present invention.

According to the present invention, a testing device 32 is provided. It is depicted in FIG. 1 as communicating with the processor-controlled devices 30 and 31 over lines 34, which represent the monitoring functions performed by the microprocessor 12. The testing device 32 includes control circuitry 36 that typically executes its own set of stored instructions. In addition to those instructions, there are substitute instructions stored in the testing device 32. During a testing procedure, the microprocessor 12 executes these substitute instructions in place of instructions from memory 28. These substitute instructions are stored in a substitute memory 38, which communicates with the data lines 24 of the bus 14. The control system itself may also communicate with the bus 14, as is indicated by lines 42 and 44, which lead between the control circuit 36 and the address and data lines 22 and 24, respectively.

Typically, memory 38 is *relocatable:* it includes memory-mapping circuitry that maps virtual addresses placed on address lines 22 into different physical addresses in the memory 38. The control circuit 36 can change this mapping as well as the contents of memory 28, as lines 46 indicate. Thus, the test circuit 32 can substitute the contents of its memory for the contents of a processor-controlled device at any address. Preferably, though, only a small portion of the address space of the microprocessor 12 is actually occupied by the memory 38 at any given time. In this way, the remaining portions of memory 38 can be tested.

According to the present invention, a read-sensor and write-overlay circuit 48 is provided. As will be described in more detail in connection with FIGS. 2 and 3, the test-system control circuit 36 transmits signals over line 52 to circuit 48 to indicate that address signals on bus lines 22 designate a location in the memory 28 for which the testing device 32 is to substitute data from the substitute memory 38. In response, the read-sensor and write-overlay circuit 48, which is connected by a line 56 to line 50, detects attempts by the microprocessor 50 to place a read signal on line 50. When the microprocessor 12 makes such an attempt, circuit 48 overdrives the microprocessor 12 circuit that drives line 50, and it thereby causes a write signal rather than a read signal to be present on line 50.

Circuit 48 is connected to control line 50 rather than to the extension 26 of that line. The reason is that the output impedance of the microprocessor's driving circuits is greater than that of the buffer circuits 18. Thus, the power required to overdrive control line 50 is less than that required to overdrive line 26. This is not a necessary feature of the present invention, of course; circuit 48 could be connected to line 26, but the power dissipation would be greater.

Circuit 48 also sends a signal over line 60 to the control circuit 36 to indicate that the read attempt has been made. In response, the control circuit 36 forwards the address signals from the address lines 22 of the bus to the substitute memory 38 and sends a read signal to the substitute memory 38 to cause it to place an instruction from the addressed memory location onto the data lines 24. The microprocessor 12 thus fetches an instruction from substitute memory 38 rather than from its own memory 28, and this substitution is performed without overdriving data lines 24. No overdriving of those lines is needed, because the read-sensor and write-overlay circuit 48 has forced line 50, and thus line 26, to indicate a write to memory rather than a read from memory, so the memory 28 of the device under test does not attempt to place its own instructions on data lines 24.

If the instruction-containing memory 28 is a read-write memory rather than a read-only memory, a result of the instruction-substitution operation will be that the instruction from the substitute memory 38 is placed into the main memory 28. This result is not ordinarily desired, but it does not present an insurmountable difficulty; since the test system 32 has control over the device under test 10, it can readily replace the proper instruction into the modified location of the main memory 28. In most cases, however, the problem does not arise, because the memory 28 containing the instructions that the device under test performs typically is a read-only memory.

Figure 2:
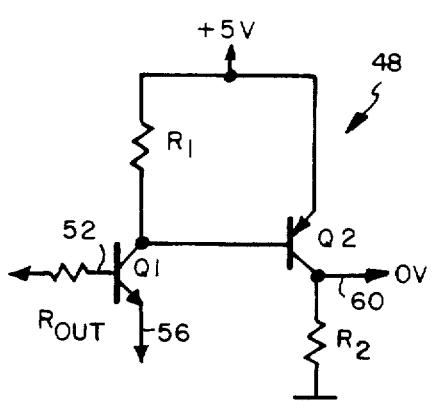
FIG. 2 is a schematic diagram of a circuit for sensing data-direction signals and overdriving the bus lines carrying those signals.

FIG. 2 shows the read-sensor and write-overlay circuit 48 in more detail. FIG. 2 includes the line 56 of FIG. 1 that leads to the control line 50 of FIG. 1. FIG. 2 also shows lines 52 and 60 by which the read-sensor and write-overlay circuit 48 communicates with the control circuit 36.

Line 52 is connected to the base of an npn transistor Q1. For ease of explanation, the output impedance $R_{out}$ of the portion of control circuit 36 that drives line 56 is shown explicitly in FIG. 2. The emitter of Q1 is connected to line 56. The collector of Q1 is connected both to the base of a pnp transistor Q2 and to a five-volt supply through a load resistor R1. The emitter of Q2 is connected directly to the five-volt supply, and its collector is connected to ground through another load resistor R2. The collector of Q2 is also connected to line 60 to send signals to the control circuit 36.

The operation of the circuit of FIG. 2 will be described in connection with the diagram of FIG. 3. Line 52 indicates whether the address designated by the signals on bus lines 22 is occupied by a location in the substitute memory 38. Since substitute memory 38 occupies only a small portion of the memory space of the microprocessor 12, the signals on bus lines 22 often do not designate such an address. In such instances, the control circuit 36 places a zero-volt signal on line 52, thereby keeping Q1 turned off. The result is negligible current in the emitter of Q1, so circuit 48 does not affect the data-direction signal on control line 50. Also, since Q1 is turned off, the resultant high signal on the collector of Q1 causes Q2 to be turned off so that a zero-volt signal is present on line 60. A high signal on line 60 is needed to cause the substitute memory 38 to place its contents on the bus data lines 24, so no substitution occurs.

Figure 3:
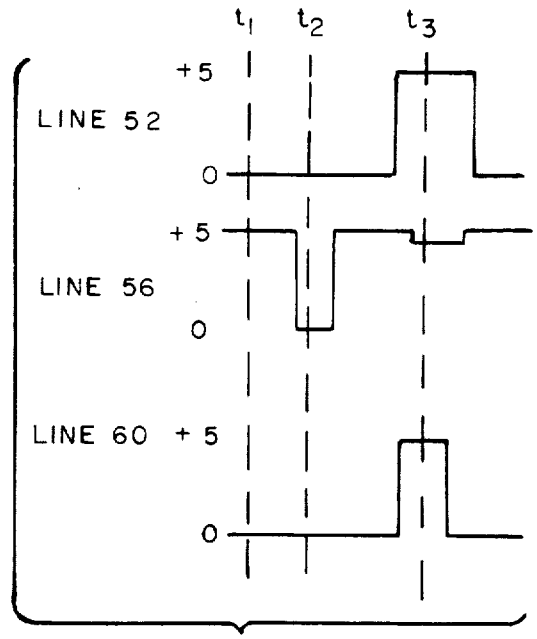
FIG. 3 is a signal diagram showing the relationship between the signals at various points in the circuit of FIG. 2.

This situation is depicted at $t_1$ of FIG. 3, where line 56 is at zero volts, indicating that the signals on lines 22 do not specify an address in substitute memory 38, and line 60 is at zero volts, indicating the substitute memory 38 is not to place contents on the bus.

Also at $t_1$, line 56 is depicted in FIG. 3 as being at a five-volt level, indicating that the microprocessor 12 is commanding data flow from the microprocessor to a microprocessor-controlled device. Like the signal on line 52, this voltage level acts to keep Q1 turned off.

At $t_2$ of FIG. 3, the microprocessor 12 indicates by a low level on line 56 that the data flow is to be from a processor-controlled device to the microprocessor 12. Nonetheless, Q1 remains turned off at $t_2$ because line 52 remains at zero volts, indicating that the address designated by the signals on bus lines 22 is not occupied by a location in memory 38. Thus, circuit 48 does not affect the data-direction signal on control line 50, and it does not send a high signal on line 60 to indicate that the substitute memory 38 is to place its contents on the data lines 24.

At $t_3$, however, the control circuit 36 has recognized an address on bus lines 22 as designating a location in the substitute memory 38. It accordingly places a high signal at the base of Q1. When the microprocessor attempts to drive line 50 to a zero-volt level to indicate that the main memory 28 is to place data on bus lines 24, it is only able to drive line 50, and thus the emitter of Q1, low enough to cause Q1 to turn on. With Q1 turned on, the microprocessor cannot drive line 50 low enough to indicate a read, so line 50 remains within the region that indicates a write. Memory 28 therefore does not place its data on bus lines 24. Instead, with Q1 turned on, a voltage drop appears across load resistor R1, causing Q2 to turn on and place a high signal on line 60. This causes the substitute memory 38 to place the contents of its addressed location onto the data lines 24. Since memory 28 does not contest the data lines 24 with memory 38, these lines have to be driven only at the normal power level, not at a power level sufficient to overcome the output circuit of the main memory 28. Thus, the power required for instruction substitution is much less with the circuit of the present invention.

Furthermore, the connections 40 and 42 of the test circuit 32 to the bus data lines 24 are used only for sensing and normal-current driving; they are not used for overdriving, so there is no need to suffer the delays that can result when the test circuit must be switched between overdriving and sensing. Only the control line 50 is overdriven in the illustrated arrangement, and the only sensing needed on that control line occurs as part of the overdriving operation; there is no switching between modes.

It is clear that the present invention can be applied to a wide variety of systems in addition to the system generally illustrated in the drawings. As was mentioned above, for example, some systems send data, address, and control signals along the same lines, and it is clear that the teachings of the present invention can be applied to such systems if an appropriate delay is provided between address recognition and the generation of an address-recognition signal.

Additionally, the circuit of FIG. 2 is merely exemplary, and the design of corresponding circuits in other embodiments will depend greatly on the system architecture. Data-direction signals may be of polarities different from those assumed in the illustrated embodiment. Furthermore, it may be necessary to overdrive more than one control line in order to change the data-direction indication.

The present invention can also be applied by overdriving a line to overcome a signal other than a data-direction signal. Some microprocessor-based systems, for instance, employ a bus protocol in which a synchronization signal other than the data-direction signal enables the chosen processor-controlled device to transmit data. In such a system, the teachings of the present invention can be applied without overdriving the data-direction lines by overdriving the line that carries the synchronization signal and thereby preventing the processor-controlled device from transmitting data.

Other modifications can also be made without departing from the teachings of the present invention. Thus, it is apparent that the advantages of the present invention can be applied to a wide variety of test systems.

I claim:

1. In a tester for testing a processor-based system that includes a processor having a processor bus, the processor placing address signals on the bus to designate addresses in its address space and command signals on the bus to direct that data be written into or read from the address-space addresses, the processor-based system also including processor-controlled devices, each of which occupies an address in the processor address space, at least a readable one of the processor-controlled devices being connected to place data on the processor bus in response to the presence on the bus of address signals designating its address and command signals directing that data are to be read from the address-space address, an instruction-substitution system for replacing data from the readable processor-controlled device with substitute data in order to cause the processor to execute test steps rather than steps designated by the data from the readable processor-controlled device, the instruction-substitution system comprising:

- A. a substitute memory including at least one memory location occupying an address in the processor address space that is also occupied by the readable processor-controlled device, the substitute memory being connectable to the processor bus to place address signals thereon and being operable by application of read signals thereto to place on the processor bus, in response to the presence on the bus of signals designating a substitute-memory location, the contents of the substitute-memory location designated by the address signals on the processor bus; and
- B. an address-recognition circuit connectable to the processor bus for sensing the address signals thereon and determining whether the address signals designate a substitute-memory location, the address-recognition circuit being connected to the processor bus and the substitute memory to send read signals to the substitute memory and to overcome command signals from the processor so that a processor-controlled device does not receive command signals directing that data be read from it if the processor attempts to place command and address signals on the bus directing that data be read from a location whose address is also occupied by a substitute-memory location, the instruction-substitution system thereby causing the processor to read data from the substitute memory rather than from a processor-controlled device when it attempts to read from a location in the processor-controlled device having an address also occupied by a substitute-memory location.

2. An instruction-substitution system as defined in claim 1 wherein:
- A. the address-recognition circuit senses whether the processor is attempting to place command signals on the bus directing that data be read from the processor-controlled device; and
- B. the address-recognition circuit sends read signals to the substitute memory only if the processor attempts to place command signals on the bus directing that data be read from the processor-controlled device.

3. An instruction-substitution system as defined in claim 2 wherein:
- A. the processor directs that data be read by sending as a command signal a first voltage within a read voltage region that indicates that the data are to be placed on the bus by the processor-controlled device;
- B. the processor indicates that data are to be written by sending as a command signal a second voltage within a write voltage region that indicates that data on the bus are to be read by the processor-controlled device; and
- C. the address-recognition circuit detects an attempt to read data from a processor-controlled device by sensing a control signal between the first voltage and the second voltage but within the write voltage region and, in response, drives the bus to cause the command signal to remain in the write voltage region when the address signals designate a substitute-memory location.

4. In testing a processor-based system that includes a processor having a processor bus, the processor placing address signals on the bus to designate addresses in its address space and command signals on the bus to direct that data be written into or read from the address-space addresses, the processor-based system also including processor-controlled devices, each of which occupies an address in the processor address space, at least a readable one of the processor-controlled devices being connected to place data on the processor bus in response to the presence on the bus of address signals designating its address and command signals directing that data be read, a method of replacing data from the readable processor-controlled device with substituting data in order to cause the processor to execute test steps rather than steps designated by the data from the readable processor-controlled device, the method comprising the steps of:

- A. sensing address signals on the bus to determine whether the address signals designate a predetermined address for which instruction substitution is intended;
- B. if the address signals designate a predetermined address for which instruction substitution is intended and the processor attempts to place command signals on the bus directing that data be read, driving the bus to overcome command signals from the processor so that a processor-controlled device does not receive command signals directing that data be read from it; and
- C. placing substitute data signals on the bus if the address signals designate a predetermined address for which instruction substitution is intended and the processor attempts to place command signals on the bus that direct that data be read, thereby causing the processor to read the substitute data signals rather than signals from a processor-controlled device.

5. A method as recited in claim 4 wherein:
- A. the method further includes the step of sensing whether the processor is attempting to place command signals on the bus that directs that data be read; and
- B. the step of placing substitute data signals on the bus is performed only if it is determined in the sensing step the processor is attempting to place command signals on the bus that direct that data be read.

6. In testing a system that includes a control circuit, a controlled device, and a bus connecting the control circuit to the controlled device for transmission of command signals from the control circuit to the controlled device and data signals from the controlled device to the control circuit, the control circuit sending command signals to the controlled device and the controlled device responding to the command signals to send data signals over the bus to the control circuit, a method of replacing data from the controlled device with substitute data, the method comprising the steps of:
- A. detecting attempts by the control circuit to command the controlled device to place data signals on the bus; and
- B. responding to at least some such attempts by:
  - (i) overdriving the bus to prevent command signals that cause the controlled device to place data signals on the bus, thereby preventing the controlled device from placing data signals on the bus; and
  - (ii) placing data signals on the bus in place of signals from the controlled device.

* * * * *